Figure 1:
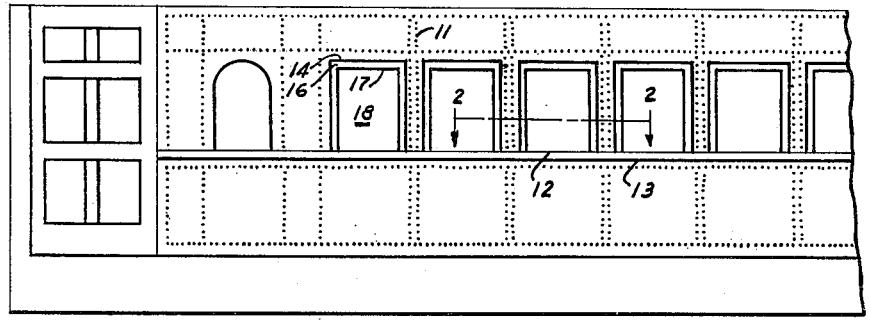

May 23, 1950 W. J. SCOTT 2,508,691
METHOD OF MANUFACTURING PROTOTYPES
Filed May 20, 1946 2 Sheets-Sheet 1

Walter J. Scott
INVENTOR

BY *E. A. Burnham*
ATTORNEY

May 23, 1950     W. J. SCOTT     2,508,691
METHOD OF MANUFACTURING PROTOTYPES
Filed May 20, 1946     2 Sheets-Sheet 2

Walter J. Scott
INVENTOR

BY
ATTORNEY

Patented May 23, 1950

2,508,691

UNITED STATES PATENT OFFICE 2,508,691

METHOD OF MANUFACTURING PROTOTYPES

Walter J. Scott, Portland, Oreg.

Application May 20, 1946, Serial No. 671,038

4 Claims. (Cl. 204—3)

The present invention relates to prototypes and to a method of manufacturing the same. It is specifically concerned with a novel process of manufacturing new and improved miniatures or models of objects having details which are to be reproduced in a plurality of planes.

Model builders and manufacturers have continuously sought to incorporate into their products all of the details of the original. However, because of various limitations in the prior manufacturing methods including the difficulty in providing suitable dies or molds including specific details, as well as the high cost of such molds, certain of the details have usually been sacrificed in order to decrease the cost of making the finished article. As a result, miniatures or models, or the sections thereof purchased by the hobbyists, generally have been more or less favorably received from the standpoint of cost but have not been completely acceptable to those whose primary concern is the incorporation of the maximum degree of fidelity into the finished products.

A primary object of the present invention is to provide a new and improved method of making prototypes.

Another object of the invention is to provide a low cost and relatively simple method of incorporating all of the desired details of an original into the prototype product.

A further object of the invention is to provide new and improved prototypes which are accurate and detailed reproductions of the original.

A still further object of the invention is to provide new and improved prototypes of portions or sections of an original which can be easily assembled by the user.

Additional objects of the invention will become apparent to those skilled in the art from the following description thereof and particularly with reference to the accompanying drawing illustrating various steps in the practice of the present invention as applied to the manufacture of a prototype of a section of a trolley car.

Briefly described, the process of the present invention comprises preparing a plan drawing showing all of the details of the object, or a section of the object, in a single plane, and preparing a plurality of etched, engraved, tooled or machined metal plates from the drawing with the details of each of the planes etched on different plates. The portions of each of the plates corresponding to areas appearing only in planes behind or below that plane are then routed, sawed or otherwise taken out of that plate after which the plates are superimposed in the proper order and secured relatively together to form a pattern which can then be employed in making a mold impression of wax or other suitable material. By depositing a layer of metal onto the mold impression, a prototype is obtained including all of the details shown on the original drawing but in three dimensional relationship.

Figure 2:
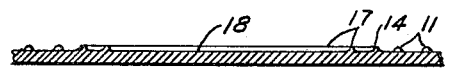
Figure 3:
Figure 4:
Figure 5:
Figure 6:
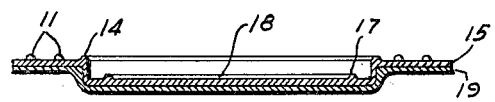
Figure 7:
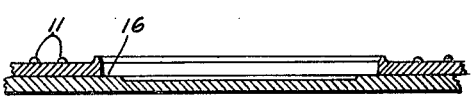
Figure 8:
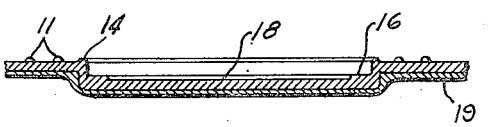
Figure 9:
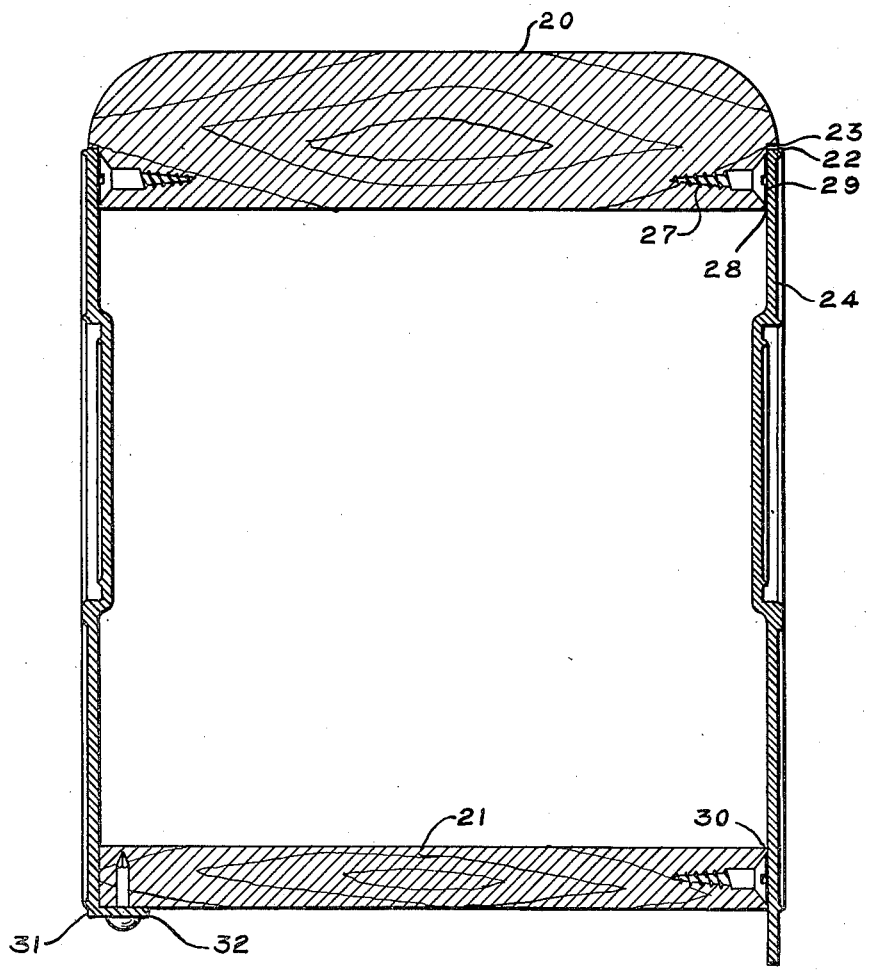

The invention will be specifically described in connection with the reproduction of a scale model of one side of a street or trolley car. In the accompanying drawing, Fig. 1 represents a detail drawing of a part of one side of a trolley car. It represents also the masked and unmasked areas of a surface of a photo-engraved plate, such as a zinc plate, prior to the etching thereof, Fig. 2 is an enlarged cross sectional view along line 2—2 of Fig. 1 of a photo-engraved plate, after the plate has been etched, Fig. 3 illustrates a cross sectional view similar to that of Fig. 2 with a portion of the plate routed out so that the plate represents the outermost plane of the car, Fig. 4 shows a mold obtained by superimposing the plate of Fig. 3 upon a second plate of Fig. 2, the mold including all of the details of the car in a plurality of planes, Fig. 5 illustrates the type of mold impression obtained by means of the mold of Fig. 4, Fig. 6 represents a similar cross section of the prototype obtained by metal coating the mold impression of Fig. 5, Fig. 7 is a cross sectional view similar to Fig. 4 but showing a mold prepared in accordance with a preferred modification of the present invention, Fig. 8 is a cross sectional view of a prototype section prepared from the mold shown in Fig. 7, and Fig. 9 is a transverse cross sectional view of a miniature or model car including prototype sections prepared in accordance with the present invention.

In carrying the process of the present invention into effect either the original article or a photograph thereof can be employed in making a suitable plan drawing of the whole or a portion thereof. Fig. 1 is intended to illustrate a plan drawing of a part of one side of a street car having details in two planes. The outermost plane is that corresponding to all of the side portion of the street car except the window sashes and glass, the principal details in this outermost plane being the rivet heads 11, the ledge running longitudinally of the car and outlined by lines 12 and 13 and the outwardly extending edges of the window frames indicated at 14. The second or inner plane includes the window sash and glass, more specifically the plane of the glass surfaces and includes as details to be reproduced in that plane the line of division 17 between the sashes 16 and the panes 18.

After preparing a line drawing showing all of the desired details of each of the planes, the finished drawing is employed in making a plurality of photo-engraved plates. Various processes whereby this can be accomplished are well known and various metal plates such as plates of copper or zinc can be employed.

The invention will be specifically described with reference to the use of zinc plates. While not limited thereto, one photo-engraving process which can be used in the practice of the present invention comprises coating a number of zinc plates with a light-sensitive mixture, such as a mixture of albumen, water and ammonium bichromate, preparing a suitable negative from the drawing and using this negative in printing or exposing the coating on the zinc plates. The plates are then washed with water to remove the soluble portions of the coating. The insoluble portions of the coating corresponding to the details shown on the drawing are then rendered acid-proof, for example, by dusting with dragon's blood followed by the application of heat, after which the plate is etched in a nitric acid bath. The acid proof protective coating can then be removed by means of hot lye. As a result there will be obtained a plurality of etched plates on which the line and point details of the drawing are in relief. The cross section of such a plate taken through a portion representing a window of the car, i. e., along line 2—2 of Fig. 1, will have the appearance such as shown in Fig. 2.

In Fig. 2 and subsequent figures, the various parts are indicated by the same reference numerals employed in connection with Fig. 1. One of these plates of Fig. 2 is then selected for the purpose of representing the outer plane of the car body and all of the sections or portions of this plate corresponding to areas existing in the second plane are routed out. Thus the portions of the plate enclosed by lines 14 and corresponding to the window sash and glass are routed out to obtain a plate which may be broadly described as having openings therein corresponding to the details appearing on the second or inner plane. Such a plate is illustrated in Fig. 3. By superimposing the plate of Fig. 3 representing the outer plane onto a plate such as shown in Fig. 2 having details of the second plane etched thereon there is obtained a composite structure such as that shown in Fig. 4. The superimposed plates may be soldered or otherwise secured together to obtain a rigid mold structure suitable for use in making impressions.

A wax or plastic impression is then made from the mold of Fig. 4 employing for example ordinary electrotyper's wax or any of the various plastic materials which have been developed for this purpose. A portion of such an impression corresponding to the mold of Fig. 4 is shown in Fig. 5 wherein all of the details present in relief on the mold surface are represented in intaglio in the wax impression. A prototype is then obtained by coating the surface of the intaglio impression with metal. The metal may be sprayed onto the surface although best results appear to be obtained by electrolytically depositing a layer of metal such as copper or the like onto the surface of the impression, which surface has first been coated with graphite, aluminum, silver or the like to render it electrically conductive. Any suitable metal plating bath can be employed for this purpose. After the layer or sheet of metal has been deposited onto the mold impression, the surface of the resultant sheet is preferably coated with a layer of tin or solder in order to strengthen the prototype sheet and to provide a basis for soldering operations subsequently to be employed in assembling the finished model. Either before or after the tinning step, the wax is melted out of the prototype leaving a detailed three-dimensional reproduction of the drawing of Fig. 1 in the form of a bendable but strong sheet of metal 15 backed by a layer of tin or solder 19, a cross section of a portion of such sheet being shown in Fig. 6.

In the above described process certain of the details have been represented by lines rather than areas. For example, the ledge running longitudinally of the car below the windows has been represented by lines 12 and 13. For increased accuracy of reproduction such details should be represented in the final product in the form of raised areas. This can be done by inking in the space between lines 12 and 13 to obtain a wide solid line which is then reproduced on the etched plate as a raised area of similar width. Similar treatment can be applied to the sash structure existing in the second plane although in this connection it is preferred to mask the area on the unetched plate corresponding to the sash structure rather than to show the sash structure as a solid line in the original drawing, since the edge of the window frame structure represented by the unetched line 14 serves as a guide for routing out the window section in the outermost plate.

Also in the preferred form of the invention all of the details of the first or upper plane appearing on plates representing planes therebelow are masked or coated with a counteretch or acid-proof coating such as asphalt applied to these plates prior to etching thereof. By this procedure only the details existing in the plane in question or in planes therebeneath are etched onto that plate.

The remaining unetched surface of that plate will be smooth and will thus provide a better support for the outer plate or plates during the pressing of the wax impression.

In Fig. 7 there is shown a mold obtained by masking in the second plate all of the surface portions corresponding to the outermost plane as well as the sash surrounding line 16. As a result of this operation the only portion of the second plate removed during the etching operation will be the surface corresponding to the glass mounted within the sash. It will be noted also that by this process the walls defining the openings routed out from the first plate can be sloped inwardly since there is no possibility of the existence of undercuts as would be the case if the walls were treated in this manner in the preparation of the mold illustrated in Figure 4.

Fig. 9 shows a transverse cross sectional view of a trolley car model including prototype sections of the present invention and illustrates certain of the advantages inherent in these novel prototypes. With reference to Fig. 9 numeral 20 indicates a cross section of a formed wooden member corresponding to the top of the car and numeral 21 a wooden base plate. The top section 20 is undercut at 22 to provide an overhang 23 and a shoulder 28 against which the prototype section 24 rests. In assembling the car a plurality of flat-headed screws 27 are screwed into the shoulder 28 with their faces flush with the surface thereof. A drop of solder 29 is applied to the heads of each of the screws. The prototype section is then laid against the shoulder 28 and a hot soldering iron run along the edge of the section to melt the solder and secure the prototype section 24 to the heads of the screws 27. The same treatment is shown as being applied to the lower right hand side of the base plate at 30. An alternative method of mounting the bottom portion of the prototype onto the base 21 comprises bending the lower edge portion as at 31 to form a flange 32 extending beneath the base 21. This flange can then be tacked or otherwise secured to the base. By either method the model is thus assembled in such a manner that none of the means employed for holding the parts together shows on the outside of the finished structure.

For simplicity of description, the invention has been described with reference to a product including details in only two planes. It will be obvious to those skilled in the art that the invention is not necessarily so limited in that details appearing in a greater number of planes may be reproduced by the use of additional plates. Referring to Fig. 4 of the drawings, for example, a further opening may be routed out in the lower plate in the area 18 for exposing details appearing in a still further plate arranged therebeneath.

Having described the invention in what are considered to be certain preferred embodiments thereof, it is desired that it be understood that the specific details shown and described herein are merely illustrative and that this invention may be carried out by other means.

What I claim is:

1. A method of making a prototype of an article of the class described and comprising details in a plurality of parallel planes, said method comprising the steps of preparing a plan drawing showing all details, preparing a plurality of etched plates from said drawing, the details of a first plane being shown on a first plate and details of a second plane being shown on a second plate, removing portions from said first plate corresponding to areas properly appearing only in said second plane, superimposing said plates whereby said details on second plate will be exposed by said first plate and offset in a different plane therefrom by the thickness of said first plate, making a mold impression of said superimposed plates, and depositing a layer of metal onto said mold impression to obtain a prototype of said article.

2. A method of making an article of the class described and comprising details in a pair of parallel planes, said method comprising the steps of preparing a plan drawing showing all of the details, photographically reproducing said drawing on a pair of metal photo-engraving plates, etching one of said plates to show the details of the first plane, masking those portions of a second plate corresponding to details appearing only in said first plane, etching the remaining portions of said second plate to show details properly appearing in a second plane, removing portions from said first plate corresponding to areas properly appearing only in said second plane, superimposing said plates with said first plate on top whereby said details on said second plate will be exposed in the areas of the removed portions of said first plate and offset in a different plane therefrom by the thickness of said first plate, making a mold impression of said superimposed plates, and depositing a layer of metal onto said impression.

3. The method of obtaining a miniature reproduction of an object including details in two substantially parallel planes which comprises making a drawing of said object including all of said details, preparing a pair of identical zinc photo-engraving positives from said drawing, etching the details of the outer plane onto the first plate, etching the details of the inner plane on the second plate, routing out openings in the first plate over the corresponding areas represented by the second plate, superimposing said first plate upon said second plate and with the details of said second plate in proper alignment with the details of said first plate, whereby said details on said second plate will be exposed through said openings in said first plate and offset therefrom by the thickness of said first plate, making a mold impression of said superimposed plates, depositing a layer of metal onto said mold impression to obtain a miniature reproduction of said object, and tinning the back surface of said miniature reproduction.

4. A method of making a prototype of an article comprising details in a plurality of parallel planes, said method comprising preparing a plan drawing showing all of the details, preparing a plurality of unetched photoengraving plates from said drawing, selecting different plates to represent each of said planes, etching each of said plates to bring out the details in the areas of the planes represented by each of said plates, removing portions from an upper one of said plates over the area of details properly appearing in a plane represented by a lower one of said plates, superimposing said plates in proper alignment with each other and with the details of the lower plate properly appearing in a lower plane being exposed through the openings caused by the removal of portions from the upper plate, making a mold impression of said superimposed plates, and employing said mold impression to obtain a prototype of said article.

WALTER J. SCOTT.

REFERENCES CITED

The following references are of record in the file of this patent:

UNITED STATES PATENTS

| Number | Name | Date |
|--------|------|------|
| 187,076 | Wimmer | Feb. 6, 1877 |
| 233,898 | Villiers | Nov. 2, 1880 |
| 625,666 | Furlong | May 23, 1899 |
| 1,498,335 | Von Hambach | June 17, 1924 |
| 1,709,327 | Spalding et al. | Apr. 16, 1929 |
| 2,172,563 | Libberton | Sept. 12, 1939 |
| 2,200,449 | Jungersen | May 14, 1940 |
| 2,258,579 | Dunn | Oct. 7, 1941 |
| 2,306,316 | Marsh | Dec. 22, 1942 |
| 2,336,423 | Rieser | Dec. 7, 1943 |